Patented May 16, 1939

2,158,650

UNITED STATES PATENT OFFICE 2,158,650

MANUFACTURE OF OXIDATION PRODUCTS OF PARAFFIN HYDROCARBONS

Christoph Beck and Franz Kremp, Ludwigshafen-on-the-Rhine, Germany, assignors to I. G. Farbenindustrie Aktiengesellschaft, Frankfort-on-the-Main, Germany No Drawing. Application January 16, 1937, Serial No. 120,910. In Germany January 30, 1936

5 Claims. (Cl. 260—451)

The present invention relates to a process for the production of oxidation products from paraffin hydrocarbons by treating with nitrogenous oxidation agents.

We have found that for the production of oxidation products of high-molecular paraffin hydrocarbons those paraffin products are especially suitable which have been recovered by treatment with aromatic nitro-hydrocarbons, such as nitrobenzene or mixtures containing the same from crude mixtures containing paraffin wax or other high-molecular paraffin hydrocarbons and in addition to the paraffin hydrocarbons, olefines, aliphatic compounds of low molecular weight and aromatic or naphthenic constituents. By the said treatment the paraffin hydrocarbons are separated from the crude initial materials. Nitrogenous oxidizing agents, in particular nitric acid or nitrous gases, are suitable for the oxidation.

Initial materials suitable for the process according to this invention are for example tar products containing high-molecular paraffin hydrocarbons, such as brown coal tars, also crude paraffin wax or hydrogenation products of coals, tars, carbon monoxide and the like. The said initial materials are mixed for example with about an equal or greater or smaller amount of nitrobenzene, preferably while heating slightly, as for example from 40° to 100° C., especially at 50° C., stirred well, cooled to a low temperature, as for example 15° C. and allowed to stand for some time. The nitrobenzene solution is then separated from the deposited paraffin waxes, the latter, which usually still contain considerable amounts of nitrobenzene, then being subjected to oxidation. In many cases it is preferable to free the paraffin hydrocarbons containing nitrobenzene from the latter prior to the oxidation, as for example by heating or by treatment with steam or the like.

Dinitrobenzenes, chlornitrobenzenes or solvent mixtures, as for example mixtures of nitrobenzene and chlornitrobenzene, may also be used instead of nitrobenzene.

In many cases it is advantageous to repeat the process as described above once or for several times while using the same or another solvent or mixture of solvents respectively. In this way especially pure paraffin hydrocarbons are obtained.

The oxidation is effected in known manner, as for example by heating the high-molecular paraffin hydrocarbons obtained with concentrated nitric acid, as for example nitric acid containing 45 per cent of HNO3, or by treating with nitrous gases. Generally speaking the oxidation is carried out while heating slightly, as for example to from about 50° to 100° C. After the oxidation, the resulting product is separated from the nitric acid, if the latter is employed as oxidizing agent, then the nitric acid or nitrous gases contained in the oxidation product are removed, for example by treating them with water or by heating. Furthermore if necessary, the oxidation product can be freed from chemically combined nitrogen, for example by treatment with alkaline agents. In this way oxidation products of a high degree of purity are obtained which may be used with advantage as initial materials for the preparation of soaps or assistants for the textile and related industries.

The following examples will further illustrate the nature of this invention but the invention is not restricted to these examples. The parts are by weight.

Example 1

10 parts of nitrobenzene are added at about 50° C. to 10 parts of dehydrated brown coal tar and the whole stirred well. The mixture is then cooled to 15° C.; after some time the nitrobenzene solution separates from the deposited paraffin wax. The crude paraffin wax thus obtained has a good crystalline form and may readily be filtered; it still has a high content of nitrobenzene. It is then treated at about 80° C. with four times the amount of 45 per cent nitric acid calculated with reference to the paraffin wax free from nitrobenzene, until a sample of the product freed from acid and nitrobenzene has a saponification value between 100 and 200. The reaction mixture is then allowed to stand until a separation into two layers takes place, of which one layer consists of nitric acid and the other of a nitrobenzene solution of the oxidation product formed. After separating the layers, the nitrobenzene solution is treated with water. The nitrobenzene is then distilled off, preferably under reduced pressure. A paraffin wax oxidation product containing nitrogen is thus obtained which is worked up in the usual manner and from which fatty acids especially suitable for the preparation of soaps may be obtained.

If the oxidation be carried further, for example so that the product has a saponification value of more than 200, as for example 300, there may be recovered from the oxidation product not only monocarboxylic acids but also considerable amounts of dicarboxylic acids.

The crude paraffin wax used for the oxidation may also be freed from combined nitrobenzene, as for example by treatment with steam. On the other hand in many cases it is advantageous to add further amounts of nitrobenzene to the crude paraffin wax before the oxidation; in this way the course of the reaction may be rendered milder.

*Example 2*

100 parts of nitro benzene are added at about 50° C. to 100 parts of brown coal tar. The solution obtained is then cooled down to 15° C. After some time precipitated hydrocarbons are filtered off, 33 parts of paraffin hydrocarbons containing nitro benzene thus being obtained. This product is again dissolved at 50° C. in nitrobenzene (66 parts) and the solution cooled down to 20° C. while stirring; the paraffin hydrocarbons precipitated are filtered off from the nitrobenzene solution.

The nitrobenzene contained in the paraffin hydrocarbons is removed by treating the latter while heating under diminished pressure. The paraffin hydrocarbons are then oxidized by treating with 60 per cent nitric acid at 90° C. until a sample possesses a saponification value of 200. After standing for a short time two layers are formed, one of which contains the oxidation product while the other consists mainly of nitric acid. The layers are separated; the nitric acid contained in the oxidation product is removed by heating the latter at 120° C. The product can be worked up for recovering fatty acids which are particularly suitable for preparing soaps.

What we claim is:

1. The process for the production of oxidation products from high-molecular paraffin hydrocarbons, which comprises treating viscous, tar-like mixtures containing high-molecular paraffin hydrocarbons with an aromatic nitro solvent containing at most 2 nitro groups, separating the purified paraffin hydrocarbon precipitated and oxidizing it by means of a nitrogenous oxidizing agent in which the nitrogen compound is the oxidizing factor.

2. The process for the production of oxidation products from high-molecular paraffin hydrocarbons which comprises treating a viscous, tar-like mixture containing high-molecular paraffin hydrocarbons with an aromatic nitro solvent containing at most 2 nitro groups, separating the paraffin hydrocarbons precipitated, removing the nitro solvent contained in the latter and oxidizing it by means of a nitrogenous oxidizing agent in which the nitrogen compound is the oxidizing factor.

3. The process for the production of oxidation products of paraffin hydrocarbons, which comprises treating viscous, tar-like mixtures containing high-molecular paraffin hydrocarbons with nitrobenzene, separating the paraffin wax and oxidizing it by means of a nitrogenous oxidizing agent in which the nitrogen compound is the oxidizing factor.

4. The process for the production of oxidation products of high-molecular paraffin hydrocarbons, which comprises treating viscous, tar-like mixtures containing high-molecular paraffin hydrocarbons with nitrobenzene at a temperature below 100° C., separating the purified paraffin wax by cooling and oxidizing it by means of nitric acid.

5. The process for the production of oxidation products from high-molecular paraffin hydrocarbons, which comprises treating a viscous, tar-like mixture containing high-molecular paraffin hydrocarbons with an aromatic nitro solvent, separating the paraffin hydrocarbons precipitated, adding a further amount of an aromatic nitro solvent and oxidizing it by means of a nitrogenous oxidizing agent in which the nitrogen compound is the oxidizing factor.

CHRISTOPH BECK.
FRANZ KREMP.